(12) United States Patent
Yoneda et al.

(10) Patent No.: US 6,439,094 B1
(45) Date of Patent: Aug. 27, 2002

(54) SAW BLADE

(75) Inventors: Akiyoshi Yoneda; Susumu Tsujimoto, both of Hyogo (JP)

(73) Assignee: Amada Company, Limited, Kanagawa (JP)

( * ) Notice: Subject to any disclaimer, the term of this patent is extended or adjusted under 35 U.S.C. 154(b) by 0 days.

(21) Appl. No.: 09/076,889

(22) Filed: May 13, 1998

(30) Foreign Application Priority Data

May 15, 1997 (JP) ............................................. 9-126039

(51) Int. Cl.[7] .......................... B27B 33/02; B23D 63/00
(52) U.S. Cl. ............................. 83/835; 83/855; 83/851; 83/846; 76/112
(58) Field of Search ........................ 83/835, 850, 851, 83/847, 848, 846, 866, 852, 855; 76/112, 25.1, 29

(56) References Cited

U.S. PATENT DOCUMENTS

| | | | | |
|---|---|---|---|---|
| 4,727,788 A | * | 3/1988 | Yoshida et al. ................ | 83/848 |
| 4,813,324 A | * | 3/1989 | Yoshida et al. ................ | 83/835 |
| 4,827,822 A | * | 5/1989 | Yoshida et al. ................ | 83/835 |
| 5,331,876 A | * | 7/1994 | Hayden, Sr. ................... | 83/661 |
| 5,427,000 A | * | 6/1995 | Hellebergh ................... | 76/112 |
| 5,501,129 A | * | 3/1996 | Armstrong et al. ............ | 83/848 |
| 5,517,889 A | * | 5/1996 | Logan .......................... | 83/835 |
| 5,603,252 A | * | 2/1997 | Hayden, Sr. ................... | 83/851 |
| 5,606,900 A | * | 3/1997 | Stoddard ....................... | 83/846 |
| 5,697,280 A | * | 12/1997 | Armstrong et al. ............ | 83/848 |
| 5,743,163 A | * | 4/1998 | Lavinder ....................... | 83/851 |
| 5,832,803 A | * | 11/1998 | Hayden, Sr. ................... | 83/661 |
| 6,003,422 A | * | 12/1999 | Holston ........................ | 83/661 |
| 6,167,792 B1 | * | 1/2001 | Korb et al. .................... | 83/835 |
| 6,220,140 B1 | * | 4/2001 | Hellebergh ................... | 83/851 |
| 6,289,767 B1 | * | 9/2001 | Cookson ....................... | 76/112 |
| 2002/0029679 A1 | * | 3/2002 | Granna ......................... | 83/846 |

FOREIGN PATENT DOCUMENTS

| | | | | |
|---|---|---|---|---|
| JP | 62-152612 | * | 7/1987 | ................... 83/835 |
| JP | 1-153215 A | * | 6/1989 | ................... 83/835 |

* cited by examiner

*Primary Examiner*—Peter Vo
*Assistant Examiner*—Minh Trinh
(74) *Attorney, Agent, or Firm*—Blank Rome Comisky & McCauley LLP

(57) ABSTRACT

A saw blade is constituted with a unset tooth, a plurality of left-set teeth and a plurality of right-set teeth. In the construction, the saw blade has the unset tooth, a plurality of left-set teeth and a plurality of right-set teeth as one group. A plurality of set widths of the plurality of set teeth are formed in the saw blade. A relief angle of a tip of the unset tooth is equal to or greater than a relief angle of a tip of the set tooth having the smallest set width. Furthermore, the relief angle of a tip becomes small in accordance that the set width becomes greater.

1 Claim, 10 Drawing Sheets

| | ANGLE OF RELIEF ($\alpha$) | |
|---|---|---|
| | GREAT ←——————→ SMALL | |
| | TOOTH ANGLE ($\beta$) | |
| | SMALL ←——————→ GREAT | |
| | RAKE ANGLE ($\theta$) | |
| | GREAT ←——————→ SMALL | |
| TIP STRENGTH | SMALL ←——————→ GREAT | |
| MESHING PERFORMANCE | GREAT ←——————→ SMALL | |

| | ANGLE OF RELIEF ($\alpha$) GREAT ←——→ SMALL |
|---|---|
| | TOOTH ANGLE ($\beta$) SMALL ←——→ GREAT |
| | RAKE ANGLE ($\theta$) GREAT ←——→ SMALL |
| TIP STRENGTH | SMALL ←——→ GREAT |
| MESHING PERFORMANCE | GREAT ←——→ SMALL |

TOOTH A

TOOTH B

TOOTH C

TOOTH A

TOOTH B

TOOTH C

TOOTH A

TOOTH B

TOOTH C

TOOTH A

TOOTH B

TOOTH C

TOOTH A

TOOTH B

TOOTH C

TOOTH A

TOOTH B

TOOTH C

TOOTH A    TOOTH B    TOOTH C

TOOTH A    TOOTH B    TOOTH C

TOOTH A    TOOTH B    TOOTH C

TOOTH A

TOOTH B

TOOTH C

TOOTH A

TOOTH B

TOOTH C

TOOTH A

TOOTH B

TOOTH C

SAW BLADE

BACKGROUND OF THE INVENTION

1. Field of the Invention

The present invention relates to a saw blade, and more particularly to a saw blade for a band saw, a circular saw, a hacksaw or the like, more specifically, to a saw blade for cutting a work piece in which a pinching phenomenon at a time of cutting an H-shaped steel is generated; for cutting a work piece such as a pipe, a sheet pile or the like in which a great vibration is generated; and for cutting a work piece such as a cut-resisting material in which a great cutting resistance is generated.

2. Description of the Related Arts

Conventionally, a band sawing machine is used as an apparatus for cutting a great size of metal work piece. In a band saw blade used for the band sawing machine, for example, in order to correspond to a chatter vibration, a noise and the like, a pattern of "a set" is set to various kinds of patterns such as a raker set, a wave set, a straight set or the like, or a pitch of each of the teeth is set to become an uneven pitch. Further, in order to correspond to a cut-resisting material such as a stainless steel, a band saw blade having a tooth height which is different from each other in the teeth is developed.

Further, as described in Japanese Patent Examined Publications Nos. 7-24973 (corresponding to U.S. Pat. No. 4,727,788,) and 7-41467 (corresponding to U.S. Pat. No. 4,813,324,), a saw blade a performance of which is greatly improved by making a tooth height and a set width of each of the teeth different and suitably combining them so as to intend to break the chips into parts is practiced.

However, in the case of a saw blade having a left-set tooth, a right-set tooth and an unset tooth, and changing set widths of the left-set tooth and the right-set tooth to plural kinds, at a time of projection of performing a cutting of the work piece (at a time of bringing a tooth of the saw blade into contact with the work piece and starting a cutting), the tooth is shifted to a direction opposite to the setting direction of the set tooth because the setting width of the set tooth is great. In this case, since the unset tooth is formed without being bent to right and left directions, it is not relatively shifted to the right and left directions at a time of inserting the work piece.

As mentioned above, the greater the set tooth is set, the greater an impact at a time of inserting into the work piece becomes, so that there is a problem that chipping and a tooth breaking are easily generated.

Further, since the unset tooth serves to improve a rectilinear propagation for cutting, there is left a room for improving meshing performance as the oscillation amount to the right and left directions is small. Further, since there is a difference in a function of each of the teeth, a relief angle, a rake angle and a tooth angle should be independently set in such a manner as to correspond to the function of each of the teeth, however, in the present condition, the relief angle, the rake angle and the tooth angle are set to be the same in all the teeth, so that there is a room for improvement.

As a high speed cutting operation in the saw blade is advanced every year, frequency of trouble such as the chipping and the tooth breaking which are not generated the conventional cutting speed is increased, and in particular, a saw blade having a higher performance is required in a cutting market for the H-shape steel, the pipe, the cut-resisting material and the like.

SUMMARY OF THE INVENTION

The present invention has been achieved with such points in mind.

It therefore is an object of the present invention to provide a saw blade having a relief angle of a tip, a rake angle and a tooth angle which are set to be suitable for a function of each of the teeth, and to provide a saw blade having a higher performance and an economical efficiency in response to needs in the market.

In order to achieve the object mentioned above, in accordance with a first aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of the plurality of set teeth are formed in the saw blade; a relief angle of a tip of the unset tooth is equal to or greater than a relief angle of a tip of the set tooth having the smallest set width; and the relief angle of a tip becomes small in accordance that the set width becomes greater.

Accordingly, the saw blade is constructed by making the unset tooth and the plurality of set teeth as one group, a meshing performance is improved by making the relief angle of a tip of the unset tooth having a small oscillation in the right and left direction great, and a tip strength is increased by making the relief angle of a tip with respect to the set teeth having a great set width and increasing the right and left oscillation small, so that the chipping and the tooth breaking can be prevented. Accordingly, a life of the saw blade can be extended.

Further, since the relief angle of a tip is made small in accordance that the set width becomes great, a tooth angle becomes great and a rigidity becomes high. Accordingly, a rigidity against a component force in a thickness direction of the saw blade at a time of cutting becomes great and a cutting accuracy is further improved.

In accordance with a second aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of the plurality of set teeth are formed in the saw blade; a rake angle of a tip of the unset tooth is equal to or greater than a rake angle of a tip of the set tooth having the smallest set width; and the rake angle of a tip becomes small in accordance that the set width becomes greater.

Accordingly, the saw blade is constructed by making the unset tooth and the plurality of set teeth as one group, a meshing performance is improved by making the rake angle of a tip of the unset tooth having a small oscillation in the right and left direction great, and a tip strength is increased by making the rake angle of a tip with respect to the set teeth having a great set width and increasing the right and left oscillation small, so that the chipping and the tooth breaking can be prevented. Accordingly, a life of the saw blade can be extended.

Further, since the rake angle of a tip is made small in accordance that the set width becomes great, a tooth angle becomes great and a rigidity becomes further high. Accordingly, a rigidity against a component force in a thickness direction of the saw blade at a time of cutting becomes great and a cutting accuracy is further improved.

In accordance with a third aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of the plurality of set teeth are formed in the saw blade; a tooth angle of the unset tooth is equal to or smaller than a tooth angle of the set tooth having the smallest set width; and the tooth angle becomes great in accordance that the set width becomes greater.

Accordingly, the saw blade is constructed by making the unset tooth and the plurality of set teeth as one group, a meshing performance is improved by making the tooth angle of the unset tooth having a small oscillation in the right and left direction small, and a tip strength is increased by making the tooth angle with respect to the set teeth having a great set width and increasing the right and left oscillation great, so that the chipping and the tooth breaking can be prevented. Accordingly, a life of the saw blade can be extended.

Further, since the tooth angle is made great in accordance that the set width becomes great, a rigidity becomes further high. Accordingly, a rigidity against a component force in a thickness direction of the saw blade at a time of cutting becomes great and a cutting accuracy is further improved.

In accordance with a fourth aspect of the present invention, there is provided a saw blade, comprising: a plurality of leading teeth for performing a cutting in a prior manner at a time of cutting a work piece; and a plurality of following teeth for expanding a cut portion of the work cut by the leading teeth, wherein the saw blade has the plurality of leading teeth and the plurality of following teeth as one group; the leading teeth have at least one unset tooth and at least one pair of right-set tooth and left-set tooth; the following teeth have at least one pair of right-set tooth and left-set tooth; a tooth height of the leading tooth is greater than a tooth height of the following tooth; a set width of the following tooth is greater than a set width of the leading tooth; and when a relief angle of a tip of the unset tooth is set to be $\alpha A$, a relief angle of a tip of a set tooth included in the leading teeth is set to be $\alpha B$, and a relief angle of a tip of a set tooth included in the following teeth is set to be $\alpha C$, a relation $\alpha A \geq \alpha B > \alpha C$ is achieved.

In the structure mentioned above, the saw blade is constructed by making the unset tooth and a plurality of set teeth one group, and a meshing performance can be improved by making the relief angle of a tip of the unset tooth having a small oscillation in the right and left direction great. Further, the chipping and the tooth breaking can be prevented by making the relief angle of a tip with respect to the set teeth having a great set width and increasing the right and left oscillation small, so that the life of the saw blade can be extended. Still further, since the following teeth having a tooth height lower than a tooth height of the leading teeth further expands the cut portion cut by the leading teeth, the rectilinear propagation is improved and a cutting with a high accuracy can be performed.

In accordance with a fifth aspect of the present invention, there is provided a saw blade, comprising: a plurality of leading teeth for performing a cutting in a prior manner at a time of cutting a work piece; and a plurality of following teeth for expanding a cut portion of the work cut by the leading teeth, wherein—the saw blade has the plurality of leading teeth and the plurality of following teeth as one group; the leading teeth have at least one unset tooth and at least one pair of right-set tooth and left-set tooth; the following teeth have at least one pair of right-set tooth and left-set tooth; a tooth height of the leading tooth is greater than a tooth height of the following tooth; a set width of the following tooth is greater than a set width of the leading tooth; and when a rake angle of a tip of the unset tooth is set to be $\theta A$, a rake angle of a tip of a set tooth included in the leading teeth is set to be $\theta B$, and a rake angle of a tip of a set tooth included in the following teeth is set to be $\theta C$, a relation $\theta A \geq \theta B > \theta C$ is achieved.

In the structure mentioned above, the saw blade is constructed by making the unset tooth and a plurality of set teeth one group, and a meshing performance can be improved by making the relief angle of a tip of the unset tooth having a small oscillation in the right and left direction great. Further, the chipping and the tooth breaking can be prevented by making the rake angle of a tip with respect to the set teeth having a great set width and increasing the right and left oscillation small, so that the life of the saw blade can be extended. Still further, since the following teeth having a tooth height lower than a tooth height of the leading teeth further expands the cut portion cut by the leading teeth, the rectilinear propagation is improved and a cutting with a high accuracy can be performed.

In accordance with a sixth aspect of the present invention, there is provided a saw blade, comprising: a plurality of leading teeth for performing a cutting in a prior manner at a time of cutting a work piece; and a plurality of following teeth for expanding a cut portion of the work cut by the leading teeth, wherein the saw blade has the plurality of leading teeth and the plurality of following teeth as one group; the leading teeth have at least one unset tooth and at least one pair of right-set tooth and left-set tooth; the following teeth have at least one pair of right-set tooth and left-set tooth; a tooth height of the leading tooth is greater than a tooth height of the following tooth; a set width of the following tooth is greater than a set width of the leading tooth; and when a tooth angle of the unset tooth is set to be $\beta A$, a tooth angle of a set tooth included in the leading teeth is set to be $\beta B$, and a tooth angle of a set tooth included in the following teeth is set to be $\beta C$, a relation $\beta C > \beta B \geq \beta A$ is achieved.

In the structure mentioned above, the saw blade is constructed by making the unset tooth and a plurality of set teeth one group, and a meshing performance can be improved by making the tooth angle of the unset tooth having a small oscillation in the right and left direction small. Further, the chipping and the tooth breaking can be prevented by making the tooth angle with respect to the set teeth having a great set width and increasing the right and left oscillation great, so that the life of the saw blade can be extended. Still further, since the following teeth having a tooth height lower than a tooth height of the leading teeth further expands the cut portion cut by the leading teeth, the rectilinear propagation is improved and a cutting with a high accuracy can be performed.

In accordance with a seventh aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of a plurality of set teeth are formed in the saw blade; and when a relief angle of a tip of the unset tooth is set to be $\alpha A$, a relief angle of a tip of a set tooth having the smallest set width is set to be $\alpha B$, and a relief angle of a tip of the other set teeth is set to be a $\alpha C$, $\alpha D$, $\alpha E$, ... , a relation $\alpha A \geq \alpha B > (\alpha C \geq \alpha D \geq \alpha E \geq \ldots)$ is achieved.

Accordingly, a meshing performance can be improved by making a relief angle of a tip of the unset tooth having a small oscillation in the right and left direction greater than a relief angle of a tip of the set tooth having the smallest set width.

Further, the chipping and the tooth breaking can be prevented by making the relief angle of the tip small in accordance that the set width becomes great so as to increase the tip strength since the oscillation to the right and left direction becomes great as the set width becomes great.

In accordance with a eighth aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of a plurality of set teeth are formed in the saw blade; and when a rake angle of a tip of the unset tooth is set to be θA, a rake angle of a tip of a set tooth having the smallest set width is set to be θB, and a rake angle of a tip of the other set teeth is set to be θC, θD, θE, . . . , a relation θA≧θB>(θC≧θD≧θE≧ . . . ) is achieved.

Accordingly, a meshing performance can be improved by making a rake angle of a tip of the unset tooth having a small oscillation in the right and left direction greater than a rake angle of a tip of the set tooth having the smallest set width. Further, the chipping and the tooth breaking can be prevented by making the rake angle of the tip small in accordance that the set width becomes great so as to increase the tip strength since the oscillation to the right and left direction becomes great as the set width becomes great.

In accordance with a ninth aspect of the present invention, there is provided a saw blade, comprising: at least one unset tooth;—a plurality of left-set teeth; and a plurality of right-set teeth, wherein the saw blade has the unset tooth, a plurality of left-set teeth and a plurality of right-set teeth as one group; a plurality of set widths of a plurality of set teeth are formed in the saw blade; and when a tooth angle of the unset tooth is set to be βA, a tooth angle of a set tooth having the smallest set width is set to be βB, and a tooth angle of the other set teeth is set to be βC, βD, βE, . . . , a relation (βC≧βD≧βE, . . . ,)>βB≧βA is achieved.

Accordingly, a meshing performance can be improved by making a tooth angle of the unset tooth having a small oscillation in the right and left direction smaller than a tooth angle of the set tooth having the smallest set width. Further, the chipping and the tooth breaking can be prevented by making the tooth angle great in accordance that the set width becomes great so as to increase the tip strength since the oscillation to the right and left direction becomes great as the set width becomes great.

In accordance with a tenth aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of a plurality of set teeth are formed in the saw blade; and when a tooth width of the unset tooth at a reference line position set at a predetermined height from a tip of the unset tooth or the set tooth in a straight line portion of a rake surface and a surface of relief of the unset tooth and the set tooth is set to be XA, a tooth width at the reference line position of the set tooth having the smallest set width is set to be XB, and a tooth width at the reference line position of the other set teeth is set to be XC, XD, XE, . . . , a relation XA≦XB<(XC≦XD≦XE . . . ) is achieved.

Accordingly, a tip strength is increased by making the set width with respect to the set tooth having a great set tooth and having a greater oscillation in the right and left direction than the tooth width of the unset tooth having a small oscillation in the right and left direction. Therefore, the chipping and the tooth breaking can be prevented.

In accordance with a eleventh aspect of the present invention, there is provided a saw blade, comprising: at least one unset tooth; a plurality of left-set teeth; and a plurality of right-set teeth, wherein the saw blade has the unset tooth, a plurality of left-set teeth and a plurality of right-set teeth as one group; a plurality of set widths of a plurality of set teeth are formed in the saw blade; and when a tooth width of the unset tooth at a reference line position set at a predetermined height from a tip of the unset tooth or the set tooth in a straight line portion of a rake surface and a surface of relief of the unset tooth and the set tooth is set to be XA, a tooth width at the reference line position of the set tooth having the smallest set width is set to be XB, and a tooth width at the reference line position of the other set teeth is set to be XC, XD, XE, . . . , a relation XA<XB≦(XC≦XD≦XE . . . ) is achieved.

Accordingly, an effect can be obtained in the case that the set width of the set tooth having the smallest set width is near the set width of the other set teeth. Therefore, a meshing performance can be improved by making the tooth width of the unset tooth having a small oscillation to the right and left direction smallest, and a tip strength can be increased by making the set width with respect to the set tooth having a great oscillation in the right and left direction great so as to prevent the chipping and the tooth breaking.

BRIEF DESCRIPTION OF THE ACCOMPANYING DRAWINGS

The above and further objects and novel features of the present invention will more fully appear from the following detailed description when the same is read in conjunction with the accompanying drawings, in which.

DETAILED DESCRIPTION OF THE PREFERRED EMBODIMENTS

Figure 1A:
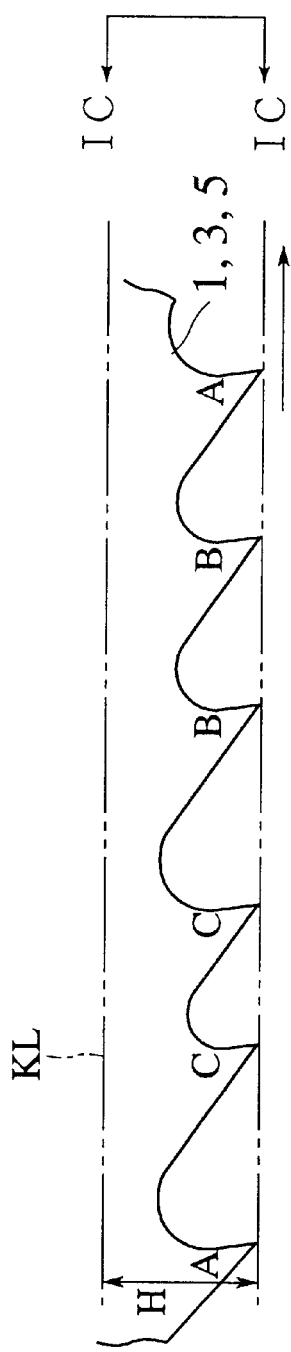
FIG. 1A is a plan view which shows a tip portion of a saw blade in accordance with a first embodiment of the present invention.
Figure 1B:
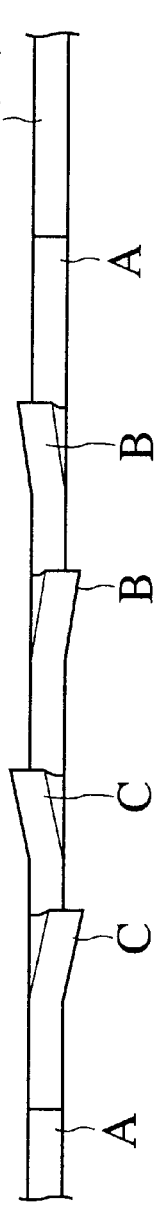
FIG. 1B is a front elevational view which shows the tip portion of the saw blade in accordance with the first embodiment of the present invention.
Figure 1C:
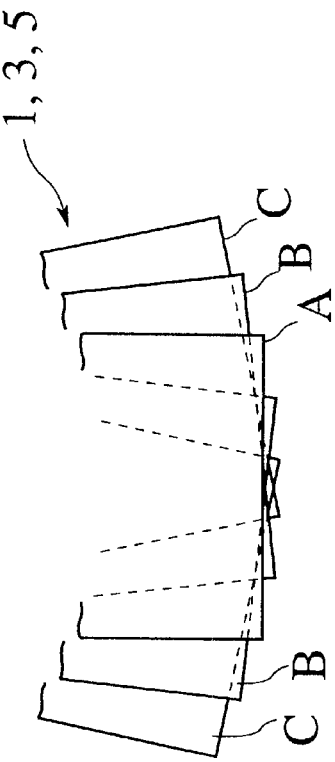
FIG. 1C is a view as seen from an arrow IC in FIG. 1A.

There will be detailed below the preferred embodiments of the present invention with reference to the accompanying drawings. Like members are designated by like reference characters.

Figures 2, 3:
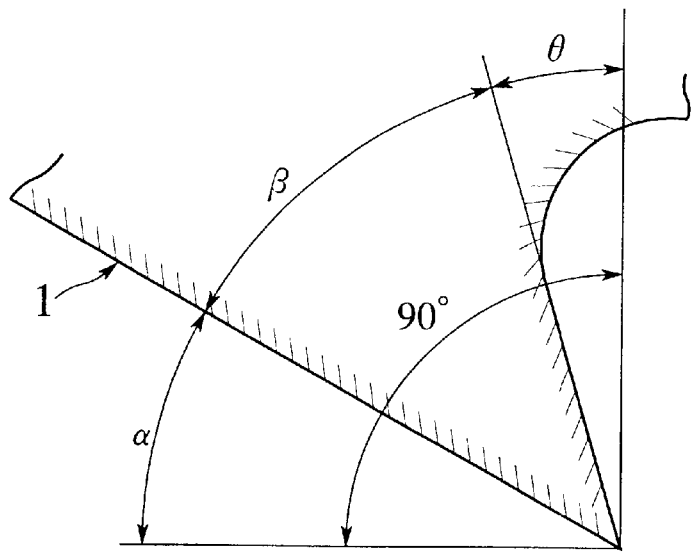
FIG. 2 is a schematic view which shows a relation among a relief angle, a tooth angle and a rake angle in the tip.
FIG. 3 is a schematic view which shows a relation between a relief angle, a tooth angle and a rake angle, and a tip strength and a meshing performance.

A method and a manner of designing a relief angle $\alpha$, a rake angle $\theta$ and a tooth angle $\beta$ of a saw blade 1 is shown in FIG. 2. Accordingly, in setting the relief angle $\alpha$, the rake angle $\theta$ and the tooth angle $\beta$, they are normally separated in such a manner that a total thereof becomes 90 degrees, and the tooth angle $\beta$ is automatically changed in accordance with a change of the relief angle $\alpha$ and the rake angle $\theta$.

A general relation between the relief angle $\alpha$, the rake angle $\theta$ and the tooth angle $\beta$, and a tip strength and a meshing performance is shown in FIG. 3. In this case, it is understood that the relief angle $\alpha$ and the rake angle $\theta$ give the same effect to the tip strength and the meshing performance, however, an influence degree per unit angle given to the tip strength is greater in the relief angle $\alpha$ than in the rake angle $\theta$.

With reference to FIGS. 1A, 1B, 1C, 4A, 4B and 4C, the saw blade 1 forming a group comprising five teeth is shown. The saw blade 1 has substantially the same tooth height H with respect to a predetermined reference line KL in all the teeth before setting.

Figure 4A:
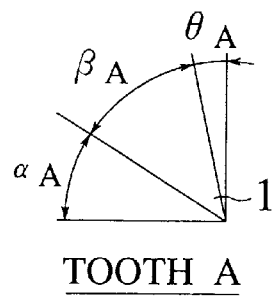
FIGS. 4A, 4B and 4C are enlarged views which respectively show a relation among a relief angle, a tooth angle and a rake angle in a tip of the saw blade.

In the saw blade, the one group has a unset tooth A, a pair of right and left set teeth B having small set widths, and a pair of right and left set teeth c having great set widths, and the case of $\theta A=\theta B=\theta C$ is exemplified. Since the unset tooth A has a small oscillation to the right and left direction, in order to improve a linearity, the relief angle $\alpha A$ is made great so as to improve the meshing performance as shown in FIG. 4A.

Figure 4B:
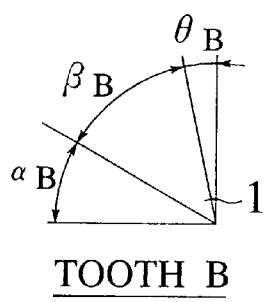
Figure 4C:
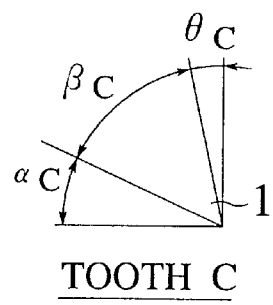

Since the set tooth C has the greatest set width, the oscillation to the right and left direction is great, and a chipping and a tooth breaking are easily generated, so that in order to improve the tip strength, the relief angle $\alpha C$ is made small as shown in FIG. 4C. Further, since the set tooth B has relatively small set width, the relief angle $\alpha B$ is made a middle value between the relief angle $\alpha A$ and the relief angle $\alpha C$ as shown in FIG. 4B, however, the relief angle $\alpha B$ may be set to be equal to the size of the relief angle $\alpha A$ ($\alpha A \geq \alpha B > \alpha C$).

Since the relief angle of the tip is made smaller in accordance that the set width of the set tooth becomes great, the tooth angle becomes great and the rigidity becomes great. Accordingly, the rigidity against a component to a thickness direction of the saw blade at a time of cutting becomes great, and a cutting accuracy is improved.

Specifically speaking, when the rake angle $\theta A$, $\theta B$ and $\theta C$ are constant, the relief angle $\alpha A$ is set to be 30 to 40 degrees, and particularly, 33 to 37 degrees is preferable. The relief angle $\alpha B$ is set to be 27 to 40 degrees, and particularly 30 to 35 degrees is preferable, however, it may be set to be the same as the relief angle $\alpha A$. Further, the relief angle $\alpha C$ is set to 20 to 35 degrees, and particularly 23 to 32 degrees is preferable.

In this case, two kinds of widths are set as a set width as mentioned above, however, one group may be constituted by five or more teeth and three kinds or more may be set. At this time, as far as the relation $\alpha A \geq \alpha B$ is satisfied, the other set teeth C, D, E, ... (D, E, ... are omitted in the drawings) may be disposed in such a manner that the relief angle $\alpha$ of the tip becomes small in accordance that the set width of the set tooth becomes great. Accordingly, when the angles of relief of the other set teeth C, D, E, ... are considered to be $\alpha C$, $\alpha D$, $\alpha E$, ..., they may be disposed in such a manner as to satisfy the relation $\alpha A \geq \alpha B > (\alpha C \geq \alpha D \geq \alpha E \ldots)$.

Further, each of the teeth can be arranged at an optional order, however, the teeth having the same set width have to be disposed to be a pair of right and left teeth in the same group.

Next, with reference to FIGS. 1A, 1B, 1C, 5A, 5B and 5C, there is shown a saw blade 3 forming one group by five teeth. All of the saw blades 3 have substantially the same tooth height H with respect to the reference line KL before setting as in the same manner as the saw blade 1.

Figure 5A:
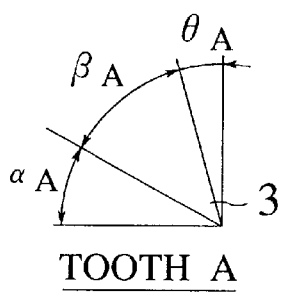
FIGS. 5A, 5B and 5C are enlarged views which respectively show a relation among a relief angle, a tooth angle and a rake angle in a tip of the saw blade.

In the saw blade, the one group has a unset tooth, a pair of right and left set teeth B having small set widths, and a pair of right and left set teeth having great set widths, and the case of αA=αB=αC is exemplified. Since the unset tooth A has a small oscillation to the right and left direction, in order to improve a linearity, the rake angle θA is made great so as to improve the meshing performance, as shown in FIG. 5A.

Figure 5B:
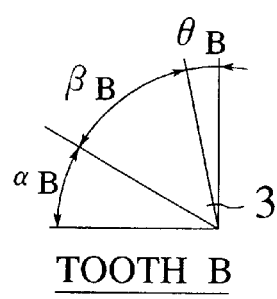
Figure 5C:
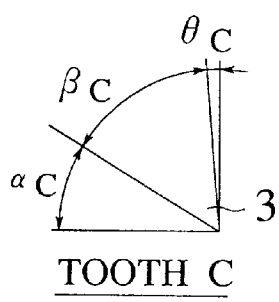

Since the set tooth C has the greatest set width, the oscillation to the right and left direction is great, and a chipping and a tooth breaking are easily generated, so that in order to improve the tip strength, the rake angle θC is made small as shown in FIG. 5C. Further, since the set tooth B has relatively small set width, the rake angle θB is made a middle value between the rake angle θA and the rake angle θC as shown in FIG. 5B, however, the rake angle θB may be set to be equal to the size of the rake angle θA (θA≧θB>θC).

Since the rake angle of the tip is made smaller in accordance that the set width of the set tooth becomes great, the tooth angle becomes great and the rigidity becomes great. Accordingly, the rigidity against a component to a thickness direction of the saw blade at a time of cutting becomes great, and a cutting accuracy is improved.

Concretely speaking, when the relief angle αA, αB and αC are constant, the rake angle θA is set to be 4 to 15 degrees, and particularly 5 to 11 degrees is preferable. The rake angle θB is set to be 3 to 13 degrees, and particularly 4 to 10 degrees is preferable. Further, the rake angle θC is set to 0 to 11 degrees, and particularly 0 to 7 degrees is preferable.

In this case, two kinds of widths are set as a set width as mentioned above, however, one group may be constituted by five or more teeth and three kinds or more may be set. At this time, as far as the relation θA≧θB is satisfied, the other set teeth C, D, E, . . . (D, E, . . . are omitted in the drawings) may be disposed in such a manner that the rake angle θ of the tip becomes small in accordance that the set width of the set tooth becomes great. Accordingly, when the rake angles of the other set teeth C, D, E, . . . are considered to be θC, θD, θE, . . . , they may be disposed in such a manner as to satisfy the relation θA≧θB>(θC≧θD≧θE, . . . ).

Further, each of the teeth can be arranged at an optional order, however, the teeth having the same set width have to be disposed to be a pair of right and left teeth in the same group. Next, with reference to FIGS. 1A, 1B, 1C, 6A, 6B and 6C, there is shown a saw blade 5 forming one group by five teeth. All of the saw blades 5 have substantially the same tooth height H with respect to the reference line KL before setting.

Figure 6A:
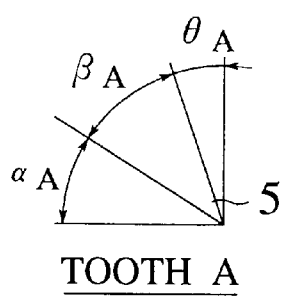
FIGS. 6A, 6B and 6C are enlarged views which respectively show a relation among a relief angle, a tooth angle and a rake angle in a tip of the saw blade.

In the saw blade, the one group has a unset tooth, a pair of right and left set teeth B having small set widths, and a pair of right and left set teeth having great set widths. Since the unset tooth A has a small oscillation to the right and left direction, in order to improve a linearity, the tooth angle βA is made small so as to improve the meshing performance, as shown in FIG. 6A.

Figure 6B:
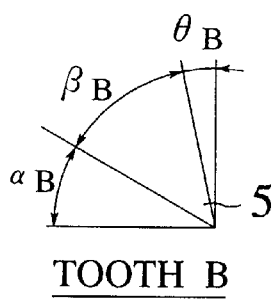
Figure 6C:
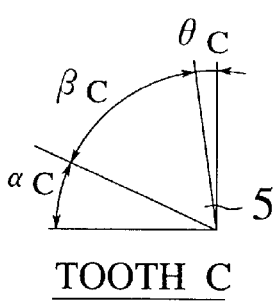

Since the set tooth C has the greatest set width, the oscillation to the right and left direction is great, and a chipping and a tooth breaking are easily generated, so that in order to improve the tip strength, the tooth angle βC is made great as shown in FIG. 6C. Further, since the set tooth B has relatively small set width, the tooth angle βB is made a middle value between the tooth angle βA and the tooth angle βC as shown in FIG. 6B, however, the tooth angle βB may be set to be equal to the size of the tooth angle βA (βC>βB≧βA).

Since the tooth angle is made greater in accordance that the set width of the set tooth becomes great, the rigidity becomes great. Accordingly, the rigidity against a component to a thickness direction of the saw blade at a time of cutting becomes great, and a cutting accuracy is improved.

Concretely speaking, the tooth angle βA is set to be 40 to 50 degrees, and particularly 44 to 49 degrees is preferable. The tooth angle βB is set to be 40 to 55 degrees, and particularly 45 to 50 degrees is preferable. Further, the tooth angle βC is set to 45 to 75 degrees, and particularly 48 to 67 degrees is preferable.

In this case, two kinds of widths are set as a set width as mentioned above, however, one group may be constituted by five or more teeth and three kinds or more may be set. At this time, as far as the relation βB≧βA is satisfied, the other set teeth C, D, E, . . . (D, E, . . . are omitted in the drawings) may be disposed in such a manner that the tooth angle β becomes small in accordance that the set width of the set tooth becomes great. Accordingly, when the tooth angles of the other set teeth C, D, E, . . . are considered to be βC, βD, βE, . . . , they may be disposed in such a manner as to satisfy the relation (βC≧βD≧βE, . . . ,)>βB≧βA.

Further, each of the teeth can be arranged at an optional order, however, the teeth having the same set width have to be disposed to be a pair of right and left teeth in the same group.

In this case, it is desired that the relief angle of the tip or the rake angle is made smaller in accordance that the set width of the set tooth becomes great, that is, the tooth angle is great, in the embodiment mentioned above.

Figure 7A:
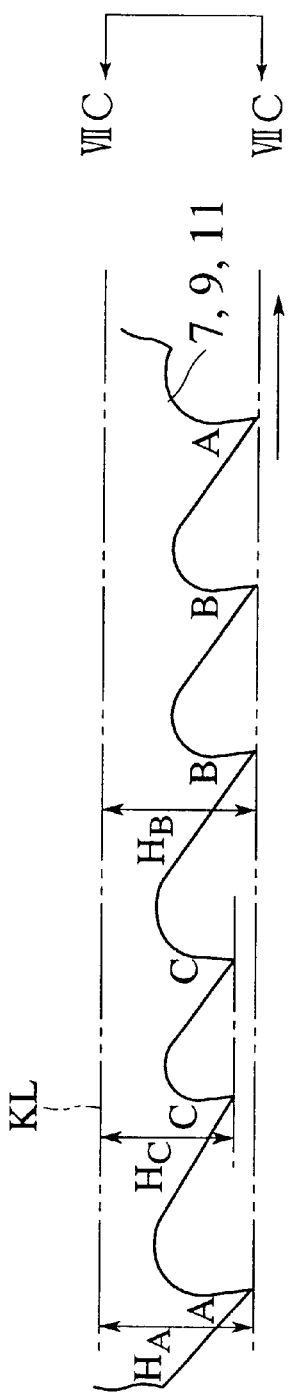
FIG. 7A is a plan view which shows a tip portion of a saw blade in accordance with a second embodiment of the present invention.

Next, with reference to FIGS. 7A, 7B, 7C, 8A, 8B and 8C, there is shown a saw blade 7 forming one group by five teeth. The saw blades 7 have difference in tooth height level before setting which is different from the cases mentioned above. Accordingly, as shown in FIG. 7A, the tooth heights HA and HB before setting with respect to the unset tooth A and the set tooth B are substantially the same with respect to the reference line KL, however, with reference to the set tooth C, the tooth height is low and different.

In the saw blade 7, the one group has a unset tooth, a pair of right and left set teeth B having small set widths, and a pair of right and left set teeth having great set widths, and the case of θA=θB=θC is exemplified. Since the unset tooth A has a small oscillation to the right and left direction, in order to improve a linearity, the relief angle αA is made great so as to improve the meshing performance as shown in 8A.

Figure 8A:
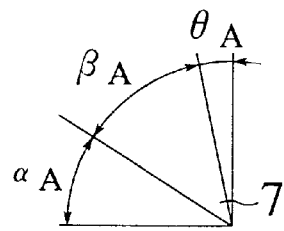
FIGS. 8A, 8B and 8C are enlarged views which respectively show a relation among a relief angle, a tooth angle and a rake angle in a tip of the saw blade.
Figure 8B:
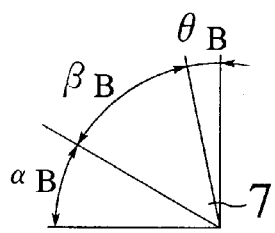
Figure 8C:
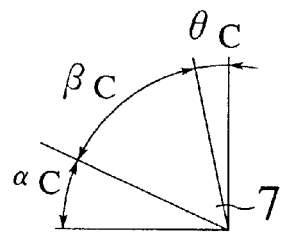

Since the set tooth C has the greatest set width, the oscillation to the right and left direction is great, and a chipping and a tooth breaking are easily generated, so that in order to improve the tip strength, the relief angle αC is made small as shown in FIG. 8C. Further, since the set tooth B has relatively small set width, the relief angle αB is made a middle value between the relief angle αA and the relief angle αC as shown in FIG. 8B, however, the relief angle αB may be set to be equal to the size of the relief angle αA (αA≧αB>αC).

Concretely speaking, when the rake angle θA, θB and θC are constant, the relief angle αA is set to be 30 to 40 degrees, and particularly 33 to 37 degrees is preferable. The relief angle αB is set to be 27 to 40 degrees, and particularly 30 to 35 degrees is preferable, however, it may be set to be the same as the relief angle αA. Further, the relief angle αC is set to 25 to 35 degrees, and particularly 23 to 32 degrees is preferable.

In this case, two kinds of widths are set as a set width as mentioned above, however, one group may be constituted by five or more teeth and three kinds or more may be set. At this time, as far as the relation αA≧αB is satisfied, the other set teeth C, D, E, . . . may be disposed in such a manner that the relief angle α of the tip becomes small in accordance that the set width of the set tooth becomes great. Accordingly, when the angles of relief of the other set teeth C, D, E, . . . are considered to be αC, αD, αE, . . . , they may be disposed in such a manner as to satisfy the relation αA≧αB>(αC≧αD≧αE, . . . ).

Further, each of the teeth can be arranged at an optional order, however, the teeth having the same set width have to be disposed to be a pair of right and left teeth in the same group.

Still further, in the saw blade 7 mentioned above, the explanation is given to the case of two kinds of tooth differences in height, however, the same explanation will be employed to the case of two or more tooth differences in height.

Next, with reference to FIGS. 7A, 7B, 7C, 9A, 9B and 9C, there is shown a saw blade 9 forming one group by five teeth. In the saw blades 9, the tooth height levels HA and HB before setting with respect to the unset tooth A and the set tooth B are substantially the same as the reference line KL, however, the tooth height level HC with reference to the set tooth C is low and different, as shown in FIG. 7A.

In the saw blade, the one group has a unset tooth, a pair of right and left set teeth B having small set widths, and a pair of right and left set teeth having great set widths, and the case of αA=αB=αC is exemplified. Since the unset tooth A has a small oscillation to the right and left direction, in order to improve a linearity, the rake angle θA is made great so as to improve the meshing performance, as shown in FIG. 5A.

Figure 9A:
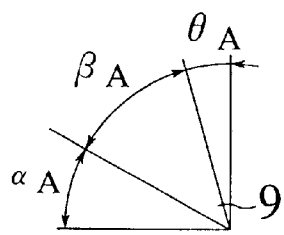
FIGS. 9A, 9B and 9C are enlarged views which respectively show a relation among a relief angle, a tooth angle and a rake angle in a tip of the saw blade.
Figure 9B:
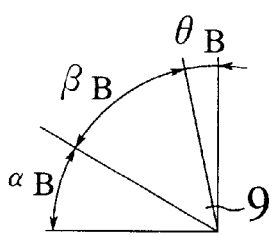
Figure 9C:
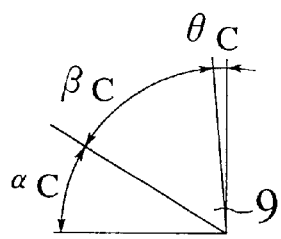

Since the set tooth C has the greatest set width, the oscillation to the right and left direction is great, and a chipping and a tooth breaking are easily generated, so that in order to improve the tip strength, the rake angle θC is made small as shown in FIG. 9C. Further, since the set tooth B has relatively small set width, the rake angle θB is made a middle value between the rake angle θA and the rake angle θC as shown in FIG. 9B, however, the rake angle θB may be set to be equal to the size of the rake angle θA (θA≧θB>θC).

Concretely speaking, when the relief angle αA, αB and αC are constant, the rake angle θA is set to be 4 to 15 degrees, and particularly 5 to 11 degrees is preferable. The rake angle θB is set to be 3 to 13 degrees, and particularly 4 to 10 degrees is preferable. Further, the rake angle θC is set to 0 to 11 degrees, and particularly 0 to 7 degrees is preferable.

In this case, two kinds of widths are set as a set width as mentioned above, however, one group may be constituted by five or more teeth and three kinds or more may be set. At this time, as far as the relation θA≧θB is satisfied, the other set teeth C, D, E, . . . may be disposed in such a manner that the rake angle θ of the tip becomes small in accordance that the set width of the set tooth becomes great. Accordingly, when the rake angles of the other set teeth C, D, E, . . . are considered to be θC, θD, θE, . . . , they may be disposed in such a manner as to satisfy the relation θA≧θB>(θC≧θD≧θE, . . . ).

Further, each of the teeth can be arranged at an optional order, however, the teeth having the same set width have to be disposed to be a pair of right and left teeth in the same group.

Still further, in the saw blade 9 mentioned above, the explanation is given to the case of two kinds of tooth differences in height, however, the same explanation will be employed to the case of two or more tooth differences in height.

Next, with reference to FIGS. 7A, 7B, 7C, 10A, 10B and 10C, there is shown a saw blade 11 forming one group by five teeth. In the saw blades 11, the tooth height levels HA and HB before setting with respect to the unset tooth A and the set tooth B are substantially the same as the reference line KL, however, the tooth height level HC with reference to the set tooth C is low and different, as shown in FIG. 7A.

Figure 10A:
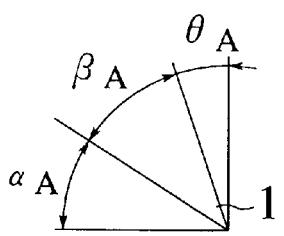
FIGS. 10A, 10B and 10C are enlarged views which respectively show a relation among a relief angle, a tooth angle and a rake angle in a tip of the saw blade.

In the saw blade, the one group has a unset tooth, two set teeth B having small set widths, and two set teeth having great set widths. Since the unset tooth A has a small oscillation to the right and left direction, in order to improve a linearity, the tooth angle βA is made small so as to improve the meshing performance, as shown in FIG. 10A.

Figure 10B:
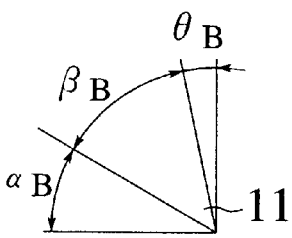
Figure 10C:
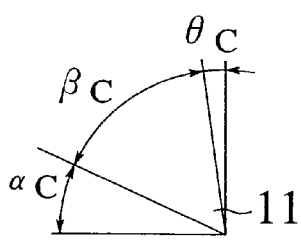

Since the set tooth C has the greatest set width, the oscillation to the right and left direction is great, and a chipping and a tooth breaking are easily generated, so that in order to improve the tip strength, the tooth angle βC is made great as shown in FIG. 10C. Further, since the set tooth B has relatively small set width, the tooth angle βB is made a middle value between the tooth angle βA and the tooth angle βC as shown in FIG. 10B, however, the tooth angle βB may be set to be equal to the size of the tooth angle βA (βC>βB≧βA).

Concretely speaking, the tooth angle βA is set to be 40 to 50 degrees, and particularly 44 to 49 degrees is preferable. The tooth angle βB is set to be 40 to 55 degrees, and particularly 45 to 50 degrees is preferable. Further, the tooth angle βC is set to 45 to 75 degrees, and particularly 48 to 67 degrees is preferable.

In this case, two kinds of widths are set as a set width as mentioned above, however, one group may be constituted by five or more teeth and three kinds or more may be set. At this time, as far as the relation βB≧βA is satisfied, the other set teeth C, D, E, . . . (D, E, . . . are omitted in the drawings) may be disposed in such a manner that the tooth angle β becomes small in accordance that the set width of the set tooth becomes great. Accordingly, when the tooth angles of the other set teeth C, D, E, . . . are considered to be βC, βD, βE, . . . , they may be disposed in such a manner as to satisfy the relation (βC≧βD≧βE, . . . ,)>βB≧βA.

Further, each of the teeth can be arranged at an optional order, however, the teeth having the same set width have to be disposed to be a pair of right and left teeth in the same group.

Still further, in the saw blade 11 mentioned above, the explanation is given to the case of two kinds of tooth differences in height, however, the same explanation will be employed to the case of two or more tooth differences in height.

Figure 7B:
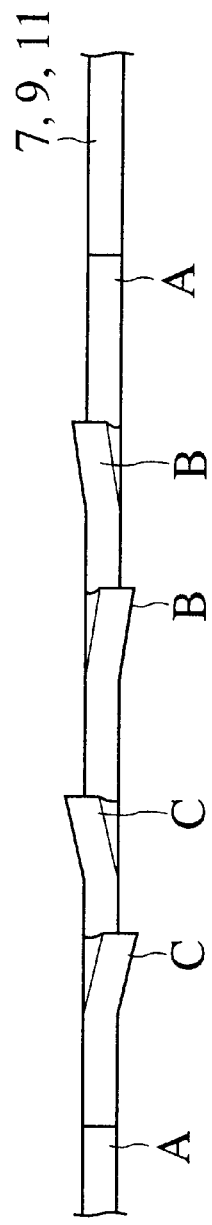
FIG. 7B is a front elevational view which shows the tip portion of the saw blade in accordance with the second embodiment of the present invention.
Figure 7C:
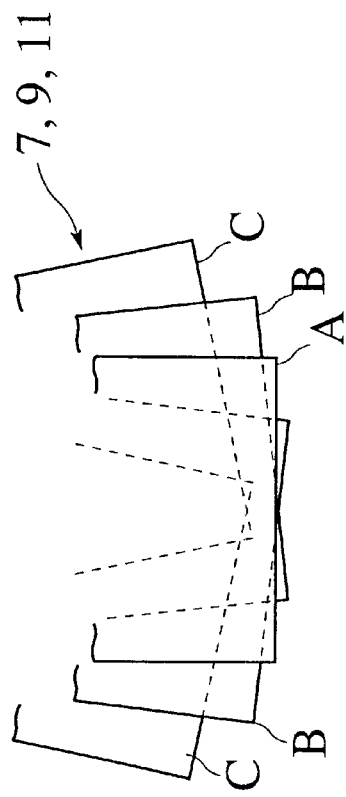
FIG. 7C is a view as seen from an arrow VIIC in FIG. 7A.
Figure 11A:
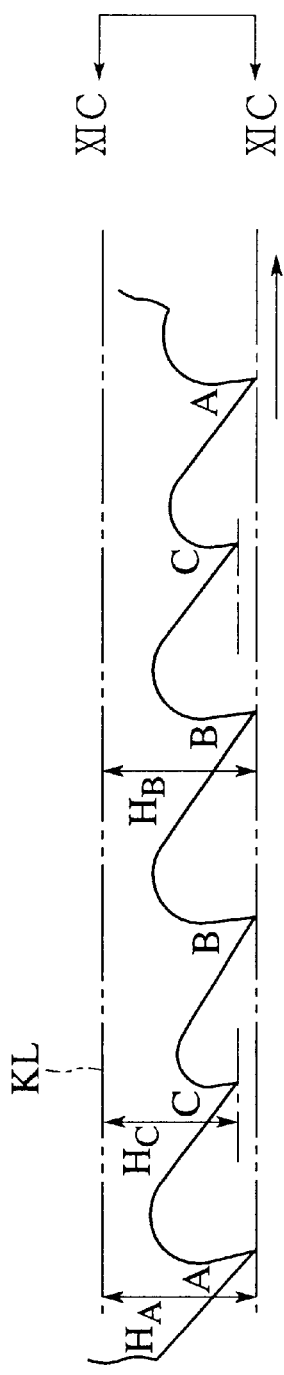
FIG. 11A is a plan view which shows a tip portion of a saw blade in accordance with the other embodiment of the present invention.
Figure 11B:
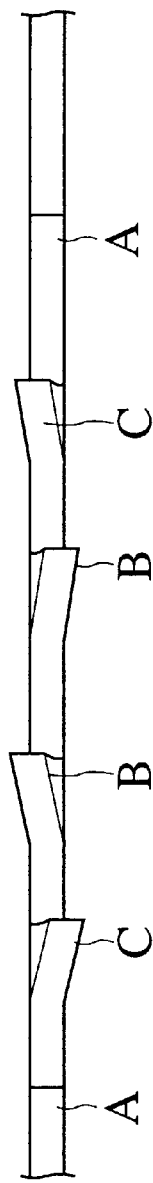
FIG. 11B is a front elevational view which shows the tip portion of the saw blade in accordance with the other embodiment of the present invention.
Figure 11C:
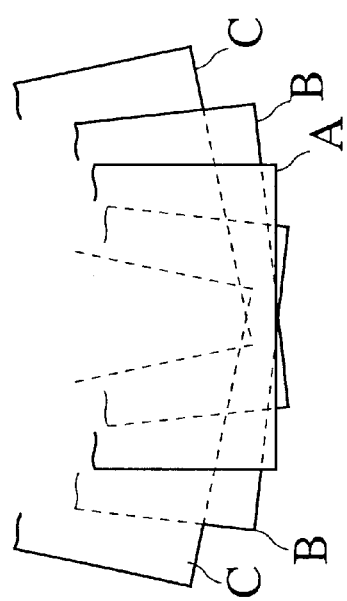
FIG. 11C is a view as seen from an arrow XIC in FIG. 11A.
Figures 12A, 12B, 12C:
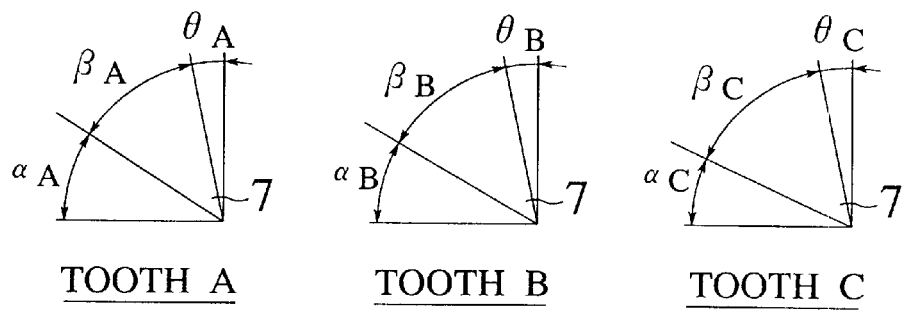
FIGS. 12A, 12B and 12C are enlarged views which respectively show a relation among a relief angle, a tooth angle and a rake angle in a tip of the saw blade.
Figures 13A, 13B, 13C:
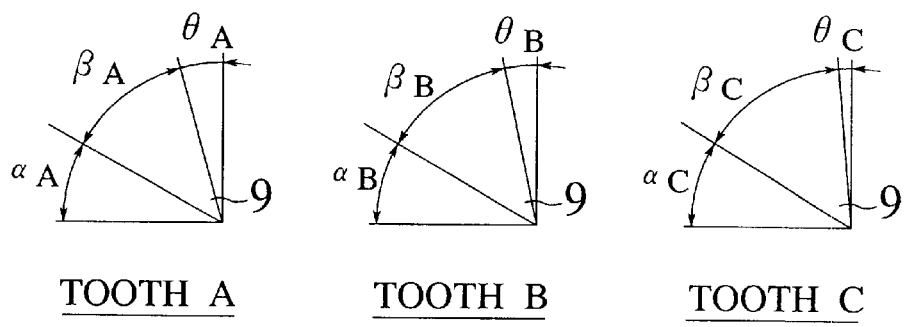
FIGS. 13A, 13B and 13C are enlarged views which respectively show a relation among a relief angle, a tooth angle and a rake angle in a tip of the saw blade.
Figures 14A, 14B, 14C:
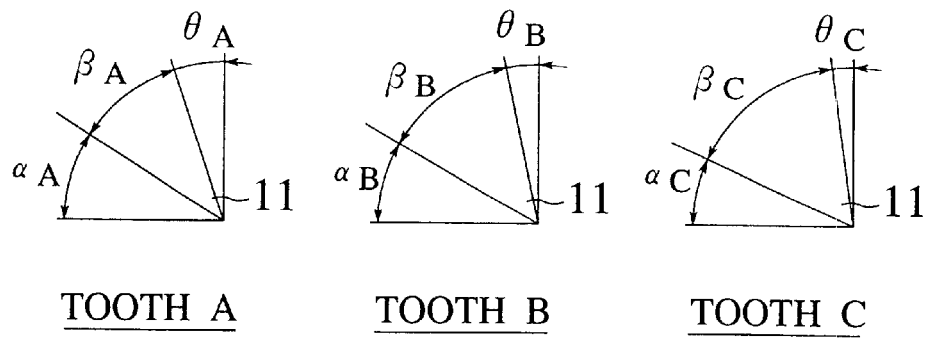
FIGS. 14A, 14B and 14C are enlarged views which respectively show a relation among a relief angle, a tooth angle and a rake angle in a tip of the saw blade.
Figure 15A:
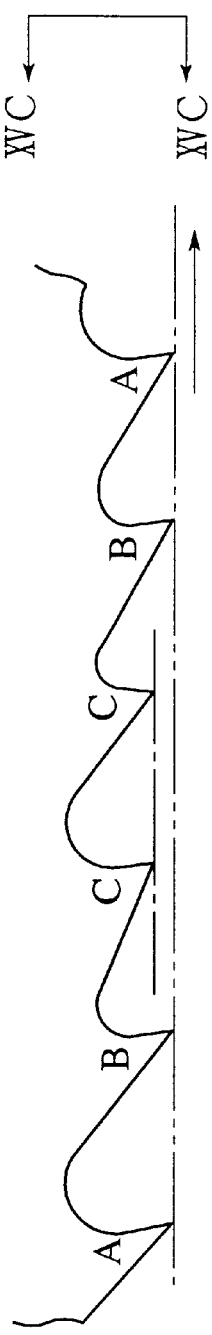
FIG. 15A is a plan view which shows a tip portion of a saw blade in accordance with further the other embodiment of the present invention.
Figure 15B:
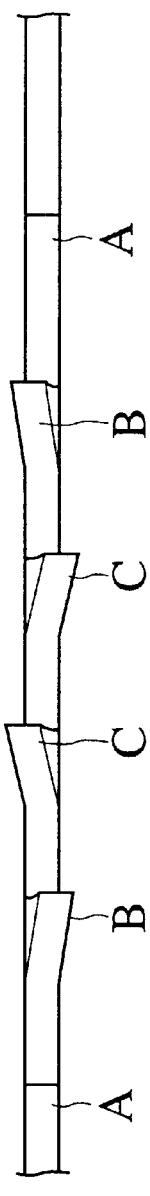
FIG. 15B is a front elevational view which shows the tip portion of the saw blade in accordance with further the other embodiment of the present invention.
Figure 15C:
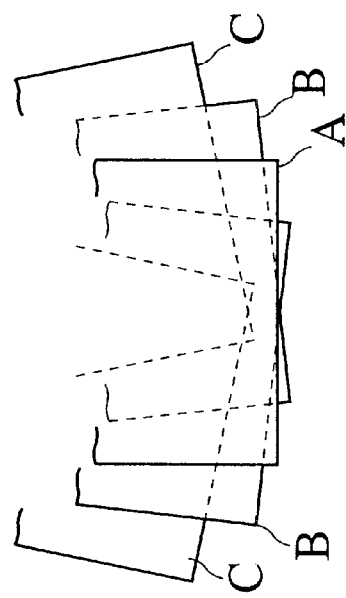
FIG. 15C is a view as seen from an arrow XVC in FIG. 15A.
Figure 16A:
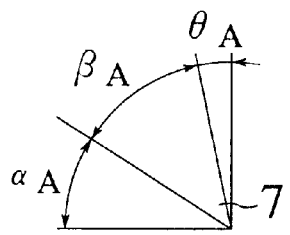
FIGS. 16A, 16B and 16C are enlarged views which respectively show a relation among a relief angle, a tooth angle and a rake angle in a tip of the saw blade.
Figure 16B:
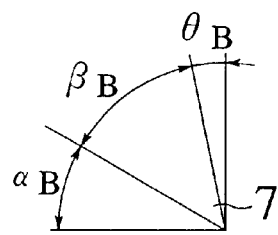
Figure 16C:
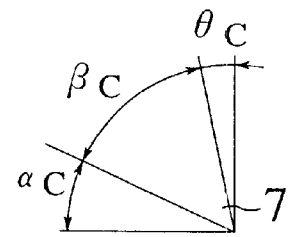
Figure 17A:
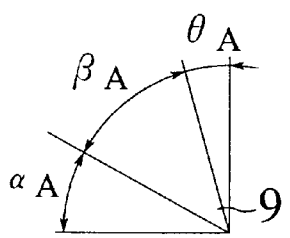
FIGS. 17A, 17B and 17C are enlarged views which respectively show a relation among a relief angle, a tooth angle and a rake angle in a tip of the saw blade.
Figure 17B:
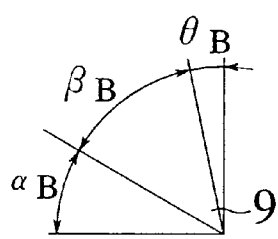
Figure 17C:
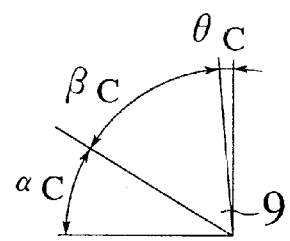
Figure 18A:
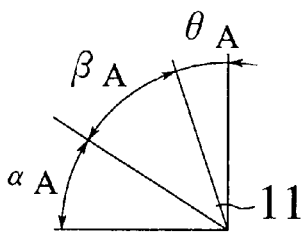
FIGS. 18A, 18B and 18C are enlarged views which respectively show a relation among a relief angle, a tooth angle and a rake angle in a tip of the saw blade.
Figure 18B:
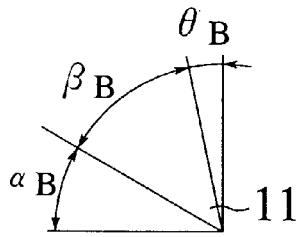
Figure 18C:
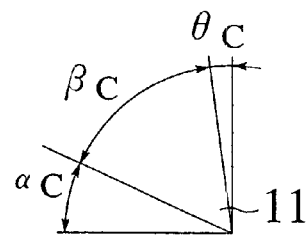

Next, the case in which an arrangement of the set tooth C having the low tooth height HC in FIGS. 7A, 7B and 7C mentioned above is changed is shown in FIGS. 11A, 11B and 11C, and the case corresponding to FIGS. 8A, 8B and 8C to FIGS. 10A, 10B and 10C mentioned above is shown in FIGS. 12A, 12B and 12C to FIGS. 14A, 14B and 14C. Further, the case in which the arrangement of the set tooth C having the low tooth height HC in FIGS. 7A, 7B and 7C is changed is shown in FIGS. 15A, 15B and 15C, and the case corresponding to FIGS. 8A, 8B and 8C to FIGS. 10A, 10B and 10C mentioned above is shown in FIGS. 16A, 16B and 16C to FIGS. 18A, 18B and 18C.

In accordance with the above results, since the unset tooth A is set without being oscillated to the right and left directions at a time of cutting, it serves to guide the other set teeth B, C, . . . , however, since the relief angle α of the unset tooth A is made great, or the rake angle θ is made great, or the tooth angle β is made small, the meshing performance is improved and the linearity is improved. Accordingly, the cutting at a high accuracy can be performed.

Further, since the relief angle α or the rake angle θ of the set teeth B, C, . . . having the great set width is made small, or the tooth angle β is made great, the tip strength is increased, so that it is hard to generate the chipping and the tooth breaking even when being oscillated to the right and left direction at a time of cutting, whereby the life of the saw blade can be extended.

Figure 19:
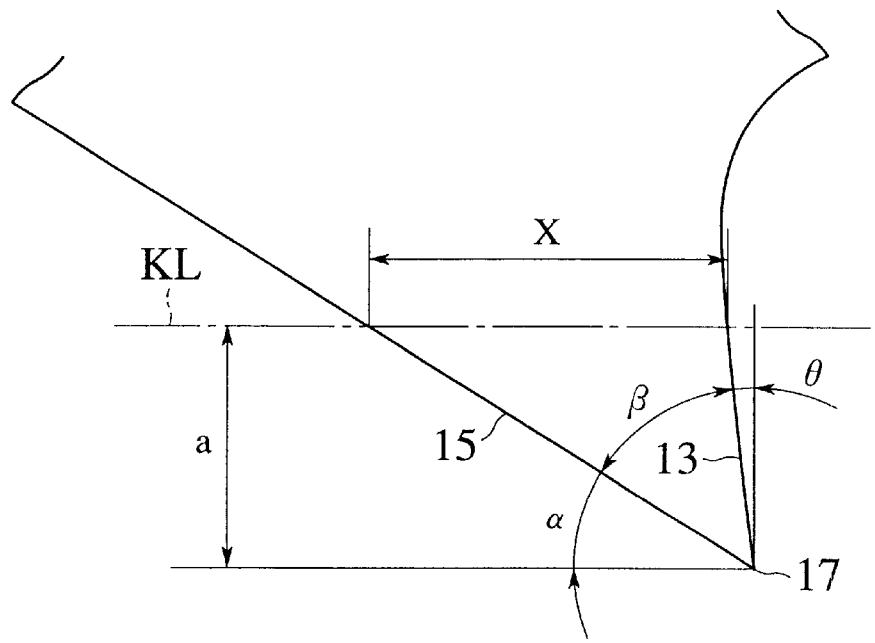
FIG. 19 is an enlarged view which shows a relation among a relief angle, a tooth angle and a rake angle in a tip of the saw blade.

Still further, with reference to FIG. 19, here, with respect to all the saw blades of the saw blades 1, 3, 5, 7, 9 and 11 mentioned above, the reference line KL is set at a predetermined height position (a in FIG. 19) from the tip 17 of the unset tooth A and the set teeth B, C, . . . in the straight line portion of the rake surface 13 and the relief surface 15 in the unset tooth A and the set teeth B, C . . . When the tooth width which the reference line KL crosses the unset tooth A or the set teeth B, C, . . . is set to be XA or XB, XC, . . . , it is considered that the tip strength is substantially proportional to the tooth width.

Furthermore, the rake angle θ, the relief angle α and the tooth angle β in each of the saw blades have the relation of θ+α+β=90 degrees as shown in FIG. 19, it is understood that the tooth width X satisfied the relation of X=a{tan(β+θ)−tan θ}.

Accordingly, since the tooth widths XB, XC, . . . of the set teeth B, C, . . . having the great set width are set to be great by setting the tooth width X with respect to the unset tooth A, the set tooth B having the small set width and the other set teeth C, D, . . . to be XA≦XB<(XC≦XD≦XE . . . ), the tip strength is increased, so that it is hard to generate the chipping and the tooth breaking even when being oscillated to the right and left direction at a time of cutting. Therefore, the life of the saw blade can be extended.

Here, in the case that the set width of the set tooth having the smallest set width is near the set width of the other set teeth, it is preferable to set the tooth width X to be XA<XB≦(XC≦XD≦XE . . . ).

Figure 20:
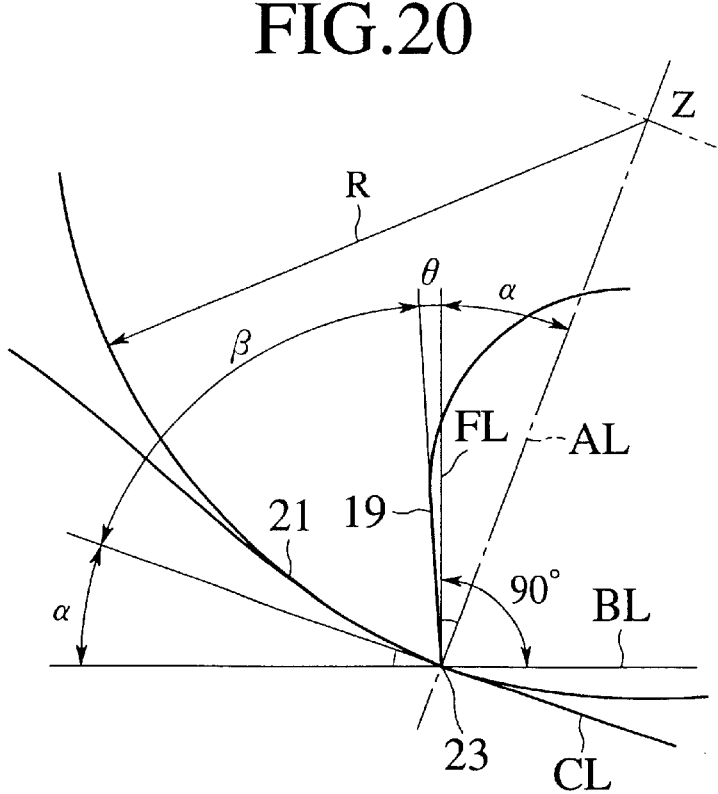
FIG. 20 is a schematic view which shows a relation among a relief angle, a tooth angle and a rake angle in the case that a surface of relief of the tip is formed in a circular shape.

Moreover, with reference to FIG. 20, in the case that the rake surface 19 is a straight line but the portion near the tip 23 of the relief surface 21 is formed in a circular shape having a radius R of curvature, it is considered that the same structure and operation as the case shown in the embodiment mentioned above is employed by considering the relief angle α of the tip to be the angle α formed between a tangential line CL of a circular arc portion in the tip 23 and a tip line BL. At this time, a center position Z of the circular arc portion is disposed on a straight line AL perpendicularly crossing the tangential line CL at the tangential line CL and the tip 23 the radius R of curvature apart from the tip 23.

With respect to the tooth angle β, the same structure and operation as that of the embodiment mentioned above can be similarly employed by considering it to be the angle formed between the tangential line CL and the rake surface 19. Here, the case that the radius R of curvature of the circular arc portion becomes infinite corresponds to the case mentioned above.

Accordingly, since the straight line AL connecting between the center portion Z and the tip 23 and the tangential line CL perpendicularly cross to each other, it is understood that the relation of β+θ+α=90 degrees is maintained in the relation among the tooth angle β, the rake angle θ and the relief angle α.

In this case, the present invention is not limited to the embodiments mentioned above, and the present invention can be realized in accordance with the other aspects by suitably modifying.

While preferred embodiments of the present invention have been described using specific terms, such description is for illustrative purposes, and it is to be understood that changes and variations may be made without departing from the spirit or scope of the following claims.

What is claimed is:

1. A band saw blade, comprising:
   at least one unset tooth;
   at least a first left set tooth which has a smallest set width;
   at least a second right set tooth which has a smallest set width;
   at least a third left set tooth which has a larger set width than the set width of the first left set tooth; and
   at least a fourth right set tooth which has a larger set width than the set width of the second right set tooth,
   wherein when a relief angle of a tip of the unset tooth is set to be αA, when a relief angle of a tip of each first left set tooth and second right set tooth is set to be αB, and when a relief angle of a tip of each third left set tooth and fourth right set tooth is set to be αC, a relation αA>αB>αC is achieved, and
   wherein αA is 33–37 degrees, αB is 30–35 degrees, and αC is 23–32 degrees.

* * * * *